United States Patent [19]

Sheppard, II

[11] Patent Number: 5,832,472
[45] Date of Patent: Nov. 3, 1998

[54] ENHANCED ELECTRONIC ENCYCLOPEDIA

[76] Inventor: Charles Bradford Sheppard, II, 170 Woodland Rd., Huntingdon Valley, Pa. 19006

[21] Appl. No.: 905,136

[22] Filed: Aug. 1, 1997

Related U.S. Application Data

[63] Continuation of Ser. No. 424,217, Apr. 19, 1995, Pat. No. 5,706,493.

[51] Int. Cl.⁶ ................................................. G06F 17/30
[52] U.S. Cl. ........................................ 707/1; 707/104
[58] Field of Search .................... 707/1, 5, 10, 100–104, 707/200–206; 434/157, 323, 322, 167

[56] References Cited

U.S. PATENT DOCUMENTS

| | | |
|---|---|---|
| 3,566,482 | 3/1971 | Morchand . |
| 4,519,606 | 5/1985 | Lussiez ................................. 273/429 |
| 4,579,533 | 4/1986 | Anderson et al. ..................... 434/157 |
| 4,712,180 | 12/1987 | Fujiyama et al. ..................... 434/323 |
| 4,891,775 | 1/1990 | McWherter ............................. 463/22 |
| 4,912,671 | 3/1990 | Ishida ....................................... 704/3 |
| 4,968,257 | 11/1990 | Yalen ..................................... 434/308 |
| 5,035,625 | 7/1991 | Munson et al. ....................... 434/332 |
| 5,180,309 | 1/1993 | Egnor ..................................... 434/323 |
| 5,203,705 | 4/1993 | Hardy ..................................... 434/169 |
| 5,219,291 | 6/1993 | Fong et al. ............................ 434/323 |
| 5,241,671 | 8/1993 | Reed et al. ............................ 707/104 |
| 5,256,067 | 10/1993 | Gildea et al. ......................... 434/169 |
| 5,257,185 | 10/1993 | Farley et al. .......................... 707/100 |
| 5,261,823 | 11/1993 | Kurokawa .............................. 434/323 |
| 5,265,065 | 11/1993 | Turtle ......................................... 707/4 |
| 5,267,865 | 12/1993 | Lee et al. ............................... 434/350 |
| 5,302,132 | 4/1994 | Corder ................................... 434/156 |
| 5,308,244 | 5/1994 | Hirose ................................... 434/169 |
| 5,316,485 | 5/1994 | Hirose ................................... 434/322 |
| 5,418,948 | 5/1995 | Turtle ......................................... 707/4 |
| 5,421,731 | 6/1995 | Walker ................................... 434/167 |
| 5,465,353 | 11/1995 | Hull et al. ................................. 707/5 |
| 5,500,920 | 3/1996 | Kupiec ................................... 704/270 |
| 5,597,307 | 1/1997 | Bedford et al. ....................... 434/118 |
| 5,624,265 | 4/1997 | Bedford et al. ................... 434/307 R |

FOREIGN PATENT DOCUMENTS 6-250582 (A)  9/1994  Japan .

OTHER PUBLICATIONS

Knowledge Adventrue, Inc., Isaac Asimov Science Adventure II User Guide, 1994.
Knowledge Adventure, Inc., Isaac Asimov Science Adventure II Quick Reference Guide, 1994.
Harold D. Nathan, Ph.D., Cliffs Notes, Inc., Cliffs Notes Review©—Chemistry, 1993.
Cliffs Notes, Inc., Cliffs Studyware® Course Review User's Manual, 1993.
Smartek Software, Facts About WordSmart®, 1993.
Smartek Software, WordSmart® User Guide CD–ROM Version, Dec. 1993.
Cliffs Notes, Inc., Cliffs Studyware® for Chemistry, 1993 (Advertisement).

(List continued on next page.)

*Primary Examiner*—Thomas G. Black
*Assistant Examiner*—Ruay Lian Ho
*Attorney, Agent, or Firm*—Ratner & Prestia

[57] ABSTRACT

An enhanced electronic encyclopedia is provided. The encyclopedia includes a database of articles stored in one or more memories. The database of articles includes base articles with article titles, article text and an objective rating. The database of articles also includes supplemental articles corresponding to base articles with a selected objective rating. Each supplemental article has an icon which identifies characteristics of the supplemental article. The encyclopedia also includes a processor, an input device and an output device. A method for creating an enhanced electronic encyclopedia is also provided.

30 Claims, 10 Drawing Sheets

OTHER PUBLICATIONS

Breland, Hunter M., Abstract, The College Board Vocabulary Study, College Board Report No. 94–4, Dialog–Eric database, 1994.

Wordsmart, Practical Home Schooling, Fall 1993, pp. 50–51.

Encarta '95 Encyclopedia from Microsoft (Product—Not Enclosed).

Carroll, John B., Abstract, Behind the Scenes in the Making of a Corpus=Based Dictionary and a Word Frequency Book, Nov. 1971, Dialog–Eric database.

"IBM" Education Local Area Network and Tools (EdLAN), sales brochure, 434/350, Jan. 1991.

STANDARD ENCYCLOPEDIA ARTICLE

CD-ROM, in computer science, acronym for compact disc read-only memory, a form of storage characterized by high capacity (roughly 600 megabytes) and the use of laser optics rather than magnetic means for reading data. Although CD-ROM devices are strictly read-only, they are similar to optical WORM devices and to optical read-write disks. See also CD-I, Sound Recording, Computer. WORM.

ENCYCLOPEDIA EXPANSION PROGRAM

STANDARD ENCYCLOPEDIA ARTICLE

CD-ROM, in computer science, acronym for compact disc read-only memory, a form of storage characterized by high capacity (roughly 600 megabytes) and the use of laser optics rather than magnetic means for reading data. Although CD-ROM devices are strictly read-only, they are similar to optical WORM devices and to optical read-write disks. See also CD-I, Sound Recording, Computer, WORM.

*EXPANSION*

GENERAL COMMENTARY   EXPERT CS

CD-ROM SOFTWARE

REFERENCE   EXPERT AA

ENCYCLOPEDIAS
      ADULT    BOOK1 CS   BOOK2 CS
      CHILDREN'S  MAG1 AA   BOOK1 CS

DICTIONARIES
      ADULT  EXPERT AA
      CHILDREN'S   EXPERT CS   BOOK1 CS

REFERENCE SUITES  BOOK2 CS
   OTHER REFERENCE   BOOK3 CS

EDUCATIONAL   EXPERT AA

EARLY LEARNING EXPERT AA  MAG1 AA
   GRADES 3-6 EXPERT AA  MAG3 AA
   MIDDLE SCHOOL EXPERT CS  MAG2 AA
   HIGH SCHOOL  MAG2 AA  BOOK3
   COLLEGE  EXPERT AA  BOOK2

FIG. 4

ENCYCLOPEDIA EXPANSION PROGRAM

STANDARD ENCYCLOPEDIA ARTICLE

CD-ROM, in computer science, acronym for compact disc read-only memory, a form of storage characterized by high capacity (roughly 600 megabytes) and the use of laser optics rather than magnetic means for reading data. Although CD-ROM devices are strictly read-only, they are similar to optical WORM devices and to optical read-write disks. See also CD-I, Sound Recording, Computer, WORM.

*EXPANSION*

GENERAL COMMENTARY   EXPERT CS

CD-ROM SOFTWARE

REFERENCE   EXPERT AA

ENCYCLOPEDIAS
    ADULT    BOOK1 CS   BOOK2 CS
    CHILDREN'S MAG1 AA   BOOK1 CS

DICTIONARIES
    ADULT EXPERT AA
    CHILDREN'S   EXPERT CS   BOOK1 CS

REFERENCE SUITES   BOOK2 CS
  OTHER REFERENCE   BOOK3 CS

EDUCATIONAL   EXPERT AA

EARLY LEARNING EXPERT AA   MAG1 AA
  GRADES 3-6 EXPERT AA   MAG3 AA
  MIDDLE SCHOOL EXPERT CS   MAG2 AA
  HIGH SCHOOL   MAG2 AA   BOOK3
  COLLEGE EXPERT AA   BOOK2

---

CD-ROMs are compact disks just like the music disks you're familiar with. They can hold more than 600,000 pages of information! CD-ROM software can do many exicting things. A CD-ROM encyclopedia can be a marvelous multimedia experience, with lots of pictures, film clips, and sound effects. Once you use one you may never be able to go back to a plain, old text encyclopedia. Also, there are lots of fun games available on CD-ROM software that give you lots of graphics. In addition, there are CD-ROMs that can actually make learning fun!

FIG. 5

ENCYCLOPEDIA EXPANSION PROGRAM

STANDARD ENCYCLOPEDIA ARTICLE

CD-ROM, in computer science, acronym for compact disc read-only memory, a form of storage characterized by high capacity (roughly 600 megabytes) and the use of laser optics rather than magnetic means for reading data. Although CD-ROM devices are strictly read-only, they are similar to optical WORM devices and to optical read-write disks. See also CD-I, Sound Recording, Computer, WORM.

*EXPANSION*

GENERAL COMMENTARY   EXPERT CS

CD-ROM SOFTWARE

REFERENCE  EXPERT AA

ENCYCLOPEDIAS
    ADULT          BOOK1 CS     BOOK2 CS
    CHILDREN'S  MAG1 AA     BOOK1 CS

DICTIONARIES
    ADULT  EXPERT AA
    CHILDREN'S  EXPERT CS   BOOK1 CS

REFERENCE SUITES  BOOK2 CS
  OTHER REFERENCE   BOOK3 CS

EDUCATIONAL  EXPERT AA

EARLY LEARNING EXPERT AA   MAG1 AA
  GRADES 3-6 EXPERT AA   MAG3 AA
  MIDDLE SCHOOL EXPERT CS   MAG2 AA
  HIGH SCHOOL  MAG2 AA  BOOK3
  COLLEGE  EXPERT AA   BOOK2

---

Reference works are what CD-ROMs are all about: one compact disc containing everything you need to know, with all the facts, figures, maps, and other data, for a specific area of knowledge. Encyclopedias are very popular. Microsoft's Encarta is a dazzling new multimedia encyclopedia. Most reviewers agree that if you can only find room for one reference CD-ROM, Microsoft Bookshelf is the one you should have. It is a collection of seven reference works that are commonly found on one's bookshelf. Other reference works of note include atlases, including 'Street Atlas USA', which lets you zoom in to incredible levels of magnification to find any street in the USA. There's also 'CNN Global

FIG. 6

ENCYCLOPEDIA EXPANSION PROGRAM

STANDARD ENCYCLOPEDIA ARTICLE

CD-ROM, in computer science, acronym for compact disc read-only memory, a form of storage characterized by high capacity (roughly 600 megabytes) and the use of laser optics rather than magnetic means for reading data. Although CD-ROM devices are strictly read-only, they are similar to optical WORM devices and to optical read-write disks. See also CD-I, Sound Recording, Computer, WORM.

*EXPANSION*

GENERAL COMMENTARY   EXPERT CS

CD-ROM SOFTWARE

REFERENCE  EXPERT AA

ENCYCLOPEDIAS
    ADULT    BOOK1 CS    BOOK2 CS
    CHILDREN'S MAG1 AA    BOOK1 CS

DICTIONARIES
    ADULT EXPERT AA
    CHILDREN'S  EXPERT CS   BOOK1 CS

REFERENCE SUITES   BOOK2 CS
  OTHER REFERENCE    BOOK3 CS

EDUCATIONAL  EXPERT AA

EARLY LEARNING EXPERT AA   MAG1 AA
  GRADES 3-6 EXPERT AA   MAG3 AA
  MIDDLE SCHOOL EXPERT CS   MAG2 AA
  HIGH SCHOOL   MAG2 AA   BOOK3
  COLLEGE EXPERT AA   BOOK2

---

GO

Review of Que's 1995 CD-ROM Buyer's Guide pgs 68-69, 84-85, 88-89 press GO button for paid access. Que gives a balanced assessment of three major encyclopedias Microsoft's Encarta, Compton's, and Grolier's. They gave a four disk rating to both Compton's and Encarta, and a 3 1/2 disk rating to Grolier's. However, it is Grolier's and Encarta that receive Que's editor's choice star. The reviewers say that Encarta (1994) takes the prize for multimedia effects and a slick interface. It is flashy and fun to use. Grolier's strength is it has a depth to its articles that you wont find elsewhere. Compton's combines some of the best features of both of them. Compton's has an especially nice searching engine in InfoPilot -

FIG. 7

ENCYCLOPEDIA EXPANSION PROGRAM

STANDARD ENCYCLOPEDIA ARTICLE

CD-ROM, in computer science, acronym for compact disc read-only memory, a form of storage characterized by high capacity (roughly 600 megabytes) and the use of laser optics rather than magnetic means for reading data. Although CD-ROM devices are strictly read-only, they are similar to optical WORM devices and to optical read-write disks. See also CD-I, Sound Recording, Computer, WORM.

*EXPANSION*
GENERAL COMMENTARY   EXPERT CS

CD-ROM SOFTWARE

REFERENCE EXPERT AA

ENCYCLOPEDIAS
    ADULT    BOOK1 CS    BOOK2 CS
    CHILDREN'S MAG1 AA    BOOK1 CS

DICTIONARIES
    ADULT EXPERT AA
    CHILDREN'S  EXPERT CS   BOOK1 CS

REFERENCE SUITES   BOOK2 CS
  OTHER REFERENCE    BOOK3 CS

EDUCATIONAL EXPERT AA

EARLY LEARNING EXPERT AA   MAG1 AA
  GRADES 3-6 EXPERT AA   MAG3 AA
  MIDDLE SCHOOL EXPERT CS   MAG2 AA
  HIGH SCHOOL  MAG2 AA  BOOK3
  COLLEGE EXPERT AA   BOOK2

---

[GO]

Compton's Interactive Encyclopedia for Windows   Rating four disks software requirements MPC Suggested Retail price $99. Compton's and I go way back. I used a Compton's Encyclopedia all through high school and college at home (this 35-year old set is still on the shelves at my Mom's house). I strayed for awhile in the mid-1970s with a tempting $1.99 a volume deal for a Funk and Wagnalls edition (now augmented with 17 year-books). I returned to the fold last year when I purchased Compton's Multimedia Encyclopedia (the predecessor to this one) for $129.00. It seemed like a bargain at the time. But, if you want to talk about bargains, look at what you can get today. For a $99 street price

STANDARD ENCYCLOPEDIA ARTICLE

CD-ROM, in computer science, acronym for compact disc read-only memory, a form of storage characterized by high capacity (roughly 600 megabytes) and the use of laser optics rather than magnetic means for reading data. Although CD-ROM devices are strictly read-only, they are similar to optical WORM devices and to optical read-write disks. See also CD-I, Sound Recording, Computer, WORM.

*EXPANSION*

GENERAL COMMENTARY   EXPERT CS

CD-ROM SOFTWARE

REFERENCE EXPERT AA

ENCYCLOPEDIAS
    ADULT    BOOK1 CS    BOOK2 CS
    CHILDREN'S  MAG1 AA    BOOK1 CS

DICTIONARIES
    ADULT EXPERT AA
    CHILDREN'S  EXPERT CS  BOOK1 CS

REFERENCE SUITES  BOOK2 CS
  OTHER REFERENCE  BOOK3 CS

EDUCATIONAL EXPERT AA

EARLY LEARNING EXPERT AA  MAG1 AA
  GRADES 3-6 EXPERT AA  MAG3 AA
  MIDDLE SCHOOL EXPERT CS  MAG2 AA
  HIGH SCHOOL  MAG2 AA  BOOK3
  COLLEGE  EXPERT AA  BOOK2

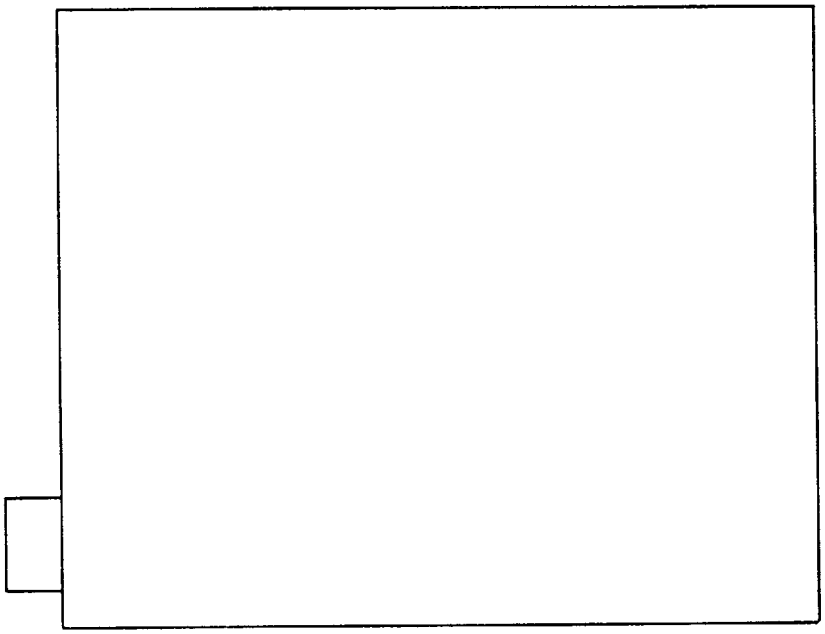

FIG. 8

ENHANCED ELECTRONIC ENCYCLOPEDIA

This application is a continuation of Ser. No. 08/424,217 Apr. 19, 1995 now U.S. Pat. No. 5,706,493.

BACKGROUND OF THE INVENTION

This invention relates to an enhanced encyclopedic reference for use in an enhanced electronic encyclopedia as well as a method for creating an enhanced electronic encyclopedia. Particularly, this invention relates to an enhanced encyclopedia in which selected articles are expanded to increase the depth of available encyclopedic information.

FIELD OF THE INVENTION

The advent of the compact disk (CD), capable of storing in excess of 600 megabytes (or 300,000 pages) of data, as well as CD read-only memory (CD-ROM) devices, has made numerous references available for use on personal computers CDs are now available with a wide variety of reference works, including encyclopedias.

However, conventional encyclopedias do not fully exploit the capabilities of existing technology. Conventional electronic encyclopedias provide a limited amount of encyclopedic information and fail to tailor encyclopedic articles to current informational needs. They are not well suited to emphasize popular or important articles or to address individual user preferences.

For purposes of illustration, the Microsoft ENCARTA Encyclopedia is a powerful multimedia system. However, the ENCARTA Encyclopedia has a limited depth of encyclopedic information. Also, the ENCARTA Encyclopedia is not well suited to emphasize popular or important articles or to address specific user preferences.

Reed et al., in U.S. Pat. No. 5,241,671, incorporated herein by reference, disclose a multimedia system having information in a wide variety of forms wherein the information is accessible by a wide variety of search paths. However, the Reed system, even in its most preferred form, has many of the deficiencies described above.

OBJECTS OF THE INVENTION

It is an object of this invention to overcome the deficiencies associated with conventional encyclopedias.

It is another object of this invention to provide an enhanced encyclopedic reference.

It is yet another object of this invention to provide an enhanced encyclopedia having expansions for selected articles.

Another object of this invention is to provide an encyclopedic database that makes it possible to address specific user preferences.

It is still another object of this invention to provide a method for creating an enhanced electronic encyclopedia according to this invention.

SUMMARY OF THE INVENTION

This invention provides an electronic encyclopedia having a database of encyclopedic articles stored in at least one memory, a processor for manipulating the database of articles, an input device for receiving article selections from a user and an output device for communicating to the user selected articles.

The database of articles includes base articles each having an objective rating. Also included are supplemental articles for base articles with a selected objective rating. Icons are preferably provided for each supplemental article to identify their characteristics.

This invention also provides a method for creating an enhanced electronic encyclopedia by forming a database of encyclopedic articles, storing the database in one or more memories, providing a processor to manipulate the database of articles and providing input and output devices for receiving information from a system user and for communicating information to the user. The database of articles is formed by providing base articles and assigning an objective rating to each base article. Supplemental articles are then provided for base articles with a selected objective rating. Icons are then preferably provided for each supplemental article to identify supplemental article characteristics.

BRIEF DESCRIPTION OF THE DRAWINGS

FIG. 2 illustrates a conventional encyclopedic article.

FIG. 3 is a sample display illustrating features of one embodiment of an enhanced electronic encyclopedia according to this invention.

FIG. 4 is the sample display shown in FIG. 3, wherein an icon "EXPERT CS" is selected and a corresponding supplemental article is displayed.

FIG. 5 is the sample display shown in FIG. 3, wherein the icon "EXPERT AA" is selected and a corresponding supplemental article is displayed.

FIG. 6 is the sample display shown in FIG. 3, wherein the icon "BOOK1 CS" is selected, a corresponding supplemental article is displayed and the "GO" icon is activated.

FIG. 7 is the sample display shown in FIG. 6, wherein the "GO" icon is selected and an independent work is displayed.

FIG. 8 is one embodiment of a form corresponding to the sample display shown in FIG. 3.

DETAILED DESCRIPTION OF THE INVENTION

Figure 1:
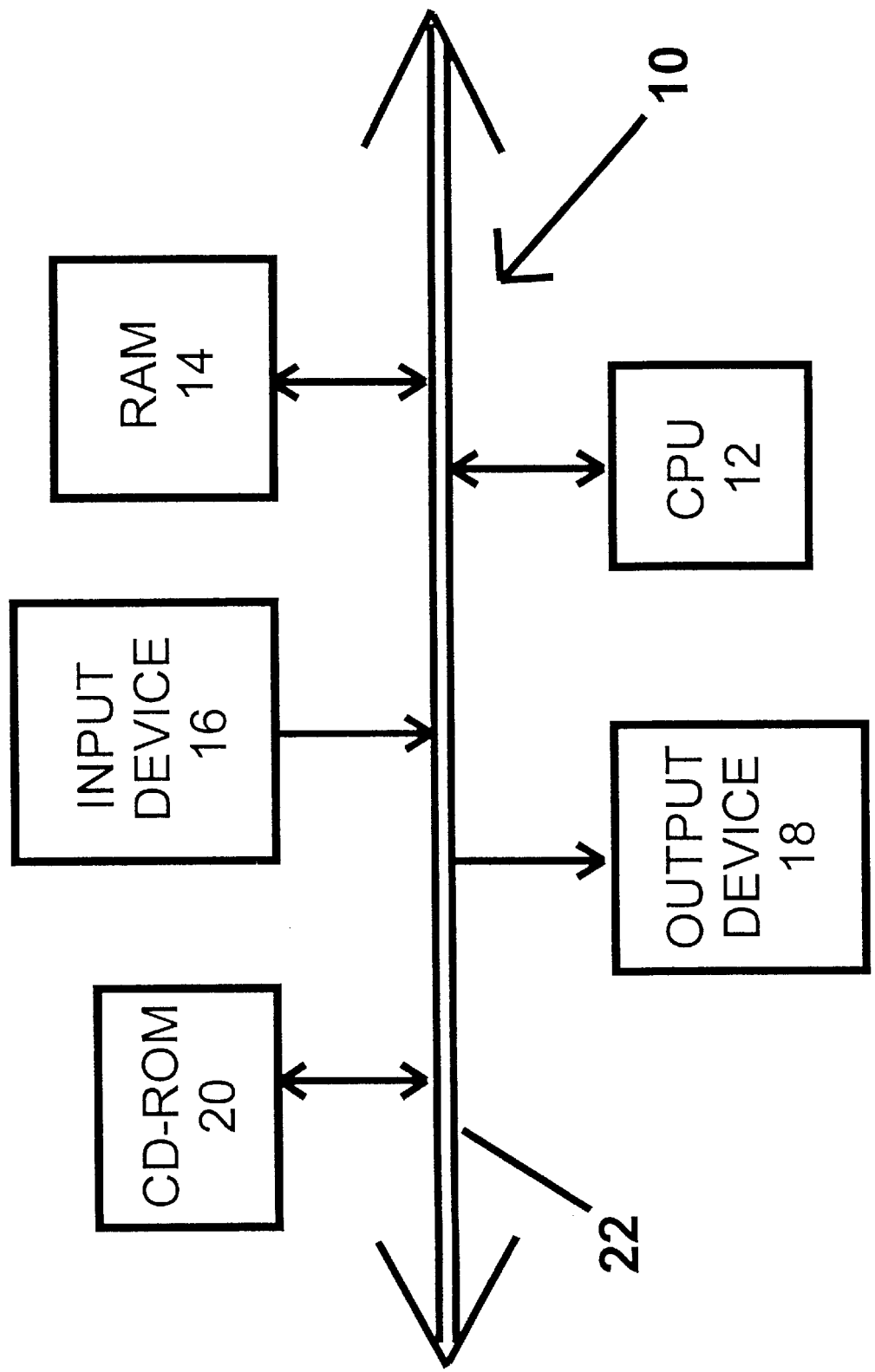
FIG. 1 is a block diagram illustrating one embodiment of an enhanced electronic encyclopedia according to this invention.

The following description is intended to refer to the specific embodiments of the invention illustrated in the drawings. This description is not intended to define or limit the scope of the invention, which is defined separately in the claims that follow.

In FIG. 1, the numeral "10" designates generally hardware components of one embodiment of an enhanced electronic encyclopedia according to this invention. A central processing unit (CPU) 12 is provided for processing data. CPU 12 is preferably an IBM-compatible personal computer that is at least as powerful as a computer with an INTEL 486 computer chip, or any equivalent processing system.

System 10 also includes a random access memory (RAM) 14 to provide storage for all data and software necessary to execute a program. RAM 14 is preferably a temporary memory and preferably includes at least four megabytes of memory or any measure of memory capable of receiving significant quantities of data and software commands.

Also included in system 10 is an input device 16 to permit communication from a system user to CPU 12. A variety of input devices are optionally used, including a standard keyboard, a mouse, a voice processor, a microphone, a light pen or any other input device capable of transferring information from the user to system 10.

System 10 also includes an output device 18 for communication of information from system 10 to a system user. A variety of output devices is contemplated including, for example, a cathode ray tube (CRT), a speaker, a voice synthesizer, a printer or any other output device.

A compact disk read-only memory (CD-ROM) 20 is also included in system 10. CD-ROM 20 is just one example of many possible read-only memory components. CD-ROM 20 is optionally substituted with a high-capacity hard drive or any other memory device capable of storing a large database of information. CD-ROM 20 is most preferably a permanent memory.

The system components shown in FIG. 1 are interconnected by a bus 22 to provide data transfer paths between various hardware components. Other optional system components are described by Reed et al in U.S. Pat. No. 5,241,671, at Column 6.

The enhanced electronic reference according to this invention includes a variety of information, such as encyclopedic articles. This body of information is referred to herein as a "database of articles." The database of articles is preferably stored in a permanent memory such as CD-ROM 20 shown in FIG. 1.

The preferred database of articles includes "base articles" which are analogous to entries in conventional encyclopedias such as the Microsoft ENCARTA Encyclopedic entry for "CD-ROM" shown in FIG. 2. Like conventional encyclopedia entries, the base articles of this invention include an article title (i.e., "CD-ROM" from the sample shown in FIG. 2) or any other identifier as well as an article text pertaining to the article title. The base articles of this invention also optionally include multimedia information such as audio, video, pictorial or other information pertaining to the article title.

Unlike conventional encyclopedic articles, the base articles of this invention also include an "objective rating." An objective rating is preferably a rating that does not depend on an opinion and most preferably relates to the relative importance or relative popularity of each base article as compared to other base articles. Many acceptable objective ratings are contemplated for use with an enhanced electronic encyclopedia according to this invention.

One preferred objective rating is referred to herein as an "importance rating," relating to the importance of the subject matter of the base article. An importance rating for a base article optionally relates to the number of times an article title corresponding to the base article is mentioned throughout a literary sample. Importance rating is preferably determined for a base article by measuring the frequency with which the corresponding article title occurs throughout the article text of the base articles in the database of articles. This frequency provides a measure of base article importance because, under one theory, a topic that appears frequently in article text will have greater importance than a topic that occurs rarely.

Importance rating for a base article is also optionally determined by the number of literary works which mention the corresponding article title. For example, base articles are optionally provided with an importance rating corresponding to the number of base articles in the database of articles having article text that mentions the corresponding article title.

Referring to Appendix A for illustration, country names are provided in ranked order based on the number of conventional articles in the Microsoft ENCARTA '95 Encyclopedia that mention each country name. Each country name is analogous to an article title. Appendix A also provides under "CUMULATIVE" the cumulative number of conventional articles in which the country names are mentioned as well as the cumulative percentage under "PERCENTAGE" of all conventional articles that mention a country name. For example, "United States" or "America" is mentioned in 5150 conventional articles (representing about 15% of all conventional articles mentioning a country) and "Chile" is mentioned in only 128 conventional articles. Accordingly, a base article of this invention having the article title "United States" or "America" is considered to be more important than a base article having the article title "Chile" because knowledge of the "United States" or "America" base article is important to the understanding of more base articles.

Another preferred objective rating is a "popularity rating," relating to the popularity of the subject matter of each base article. A popularity rating is optionally determined for a base article by measuring the frequency with which the corresponding article title occurs in a literary sample. The literary sample is preferably a collection of current literature, periodicals and other resources. Examples of contemplated literature samples include magazines, newspapers, and any other popular information sources. The theory behind a popularity rating is that the frequency with which an article title occurs in a current literary sample (i.e., 1994 magazines) provides a measure of the popularity of the base article subject matter.

An illustration of popularity rating is described with reference to Appendix B. Appendix B provides a list of sample topics that are analogous to article titles. Next to each topic is a number representing the frequency with which the topic appeared in a periodical database. Specifically, the frequency numbers resulted from an topic search in the PROQUEST database periodical file for the dates January, 1993 through February, 1995.

It is interesting to note that some of the most frequently appearing topics have quite limited coverage in conventional encyclopedias. For example, there is only one short paragraph devoted to the topic "CD-ROM" in Microsoft's ENCARTA as illustrated in FIG. 2. However, Appendix B indicates that the topic "CD-ROM" ranks 14th from the top in order of popularity.

The theory behind the popularity rating according to this invention is that the article titles that have the most written about them in popular literature are likely to be the most popular with readers and, therefore, of greatest interest to encyclopedia users. Accordingly, the base articles having article titles with the highest popularity rating should be expanded or enhanced more than those having a low popularity rating.

Preferably, the amount a base article is enhanced or expanded is proportional to the popularity rating. For example, a base article having the article title "AUTOMOBILES" (frequency of 6342 in Appendix B) is preferably expanded about four times as much as a base article having the article title "ASTRONOMY" (frequency of 1508). However, base articles having a high popularity rating that are already adequately covered in the base article need not be expanded.

Other objective ratings are optionally used. For example, polling techniques and other methods are optionally used to determine objective ratings for base articles.

The database of articles according to this invention also includes "supplemental articles," representing any information provided to supplement corresponding base articles described above. Supplemental articles are preferably provided for "important base articles." "Important base articles" are those base articles selected depending upon an importance rating. For example, referring to Appendix A, important base articles optionally include those base articles having an article title with a minimum frequency, such as 200 to include article titles ranked No. 1 ("United States" or "America") to No. 33 ("Vietnam"). Supplemental articles are also preferably provided for "popular base articles." "Popular base articles" are those base articles selected depending upon a popularity rating. For example, referring to Appendix B, popular base articles optionally include those base articles having an article title with a minimum frequency, such as 1000 to include all article titles above "DIET" (frequency of 1027). Supplemental articles are most preferably provided in proportion to the importance rating and popularity rating of corresponding base articles. It is of course contemplated that at least some base articles are optionally designated both "important" and "popular."

Important base articles and popular base articles are optionally broken down into sub-topics relating to various aspects of the base article. Sub-topics are preferably defined by an "expert." The term "expert" as used herein refers to any individual or group of individuals having some knowledge of one or more base articles, or to any reference or resource that relates to the content of one or more base articles. For example, an expert is optionally a staff member of the firm that compiles the database of articles, an individual or group of individuals knowledgeable in a specific subject area, or any other individual or group of individuals capable of breaking down a base article into sub-topics. An expert is also optionally any separate literary work capable of identifying sub-topics.

Supplemental articles are preferably provided corresponding to selected base articles (i.e., important base articles and popular base articles) or to base article sub-topics. Supplemental articles most preferably correspond to the most specific sub-topic for which a base article does not exist. For example, the base article for the article title "United States" optionally includes a sub-topic "California" which, in turn, optionally includes a sub-topic "Los Angeles." However, separate base articles are likely to be provided for sub-topic "California" and for sub-topic "Los Angeles." Accordingly, supplemental articles are most preferably provided to correspond to the base article having the article title "Los Angeles" or even to some sub-topic of that base article.

Supplemental articles are also optionally provided by one or more experts even when a corresponding base article or sub-topic does not exist. For example, an expert may deem a subject important or popular, but that subject may not be covered in an existing base article or sub-topic. Accordingly, a supplemental article is preferably provided.

Supplemental articles preferably fit within several categories. One preferred category includes compositions written by one or more experts solely for inclusion in the database of articles. An expert composition is optionally any expansion or other text relating to the corresponding base article.

Another preferred category of supplemental articles includes reviews, summaries or explanations written by an expert or group of experts regarding an independent work such as a journal, a magazine, a lecture, a book, a newspaper or any other work. The independent work is optionally provided in the database of articles or access to the independent work or an excerpt thereof is optionally provided. For example, independent works in the form of lectures are optionally stored as part of the database of articles. On the other hand, other independent works are optionally accessed via "paid access." Paid access is optionally provided via an on-line service (such as the LEXIS/NEXIS Database provided by Mead Data Central, Inc.) or by means of a code which provides access to encrypted data stored in the database of articles or elsewhere in the encyclopedia system. These paid access modes are described in more detail below with reference to the preferred embodiment of this invention.

Each supplemental article is preferably identified and described by an "icon" or any suitable symbol, label or indicator communicated to the encyclopedia user to provide information regarding the corresponding supplemental article. Icons indicate the existence of a corresponding supplemental article and preferably include information regarding the difficulty level, type and author of the corresponding supplemental article.

Difficulty level is optionally defined in terms of level of education completed (i.e., elementary school, middle school, high school, undergraduate and graduate levels) or general knowledge level (i.e., technical or layperson). Icons of this invention preferably indicate difficulty level by use of color. For example, an icon having a green background preferably indicates a high school difficulty level and the color yellow preferably indicates an elementary school difficulty level. This feature permits an encyclopedia user to select supplemental articles appropriate to his or her knowledge level.

Supplemental article icons preferably identify the type or category of the supplemental article by identifying the supplemental article as either a review, summary or explanation of an independent work or as an expert composition. This feature permits encyclopedia users to select supplemental articles of a desired type. Supplemental article icons identifying a supplemental article as relating to an independent work preferably provide a numerical number for the work associated with a specific base article, as will be described below.

Supplemental article icons preferably identify the author of the supplemental article by providing the initials of the expert that prepared the supplemental article or the initials of the author of an underlying independent work. For example, if a supplemental article refers to a book as an independent work, that icon optionally includes the initials of the book author. Also, if the supplemental article is an expert composition, that icon preferably includes the initials for that expert. This feature is helpful to an encyclopedia user who wishes to identify and seek out supplemental articles associated with a specific expert or author.

For purposes of illustration, the icon "BOOK1 CS" in the color green indicates that the corresponding supplemental article is a review, summary or explanation of a book; that the book is the first book cited within the associated base article; that the book author's or expert's initials are C.S.; and that the review, summary or explanation in the supplemental article is written for the high school level. Examples of other icons will be described with reference to the preferred embodiment of this invention.

The database of articles, according to this invention, is preferably stored in permanent memory. The database of articles is preferably stored in a single memory, but is optionally stored on different memory types and different storage devices. For example, the database of articles is optionally stored on one or more CD-ROM disks such as CD-ROM 20 described with reference to FIG. 1.

In view of current technology, the database of articles is preferably stored on three CD-ROM disks. The first disk preferably stores the base articles with any multimedia information available for the base articles. The base articles on the first disk preferably include an indication as to whether an enhancement or expansion is provided (i.e. whether that base article has been designated an important base article and/or a popular base article having one or more supplemental articles). The second CD-ROM disk preferably stores supplemental articles as well as any encrypted articles provided for paid access. The second disk preferably is limited to textual information. The third CD-ROM disk preferably stores multimedia information for the supplemental articles and other information stored in the second disk, if such multimedia information is available.

In preferred operation, a user preferably uses the first disk to access base articles. If a viewed base article indicates that expansion or enhancement is available, the user is prompted to insert the second disk to provide access to supplemental articles or other information corresponding to the base article. The supplemental article preferably indicates whether multimedia information is available. If so, the user is prompted to insert the third disk to access this multimedia information.

A preferred embodiment of the enhanced electronic encyclopedia according to this invention is now described with reference to FIGS. 3–8 as well as Appendix C and Appendix D.

Referring to FIG. 3, a preferred display is shown. The screen shown in FIG. 3 is an expansion of the screen displayed and illustrated in FIG. 2 and described above.

At the top left of the screen shown in FIG. 3, an icon (-) is provided for access to a base article menu (not shown). Near the top of the screen is presented a base article, labeled here "Standard Encyclopedia Article." This sample screen shows a Microsoft ENCARTA Encyclopedia article for illustrative purposes only (therefore labeled a standard encyclopedia article) that will be referred to as a base article. The base article shown in FIG. 3 has an article title "CD-ROM" followed by slightly more than four lines of article text.

Below the article text, and under the label "EXPANSION," are a series of subtopics relating to the base article. A sub-topic "GENERAL COMMENTARIES" is provided, corresponding to a supplemental article identified by the icon "EXPERT CS." Also listed is a sub-topic "CD-ROM SOFTWARE" which is further broken down into sub-topics "REFERENCE" and "EDUCATIONAL." Sub-topic "REFERENCE" is further broken down into sub-topics "ENCYCLOPEDIAS," "DICTIONARIES," "REFERENCE SUITES," and "OTHER REFERENCE," the sub-topics "ENCYCLOPEDIAS" and "DICTIONARIES" both being further broken down into sub-topics "ADULT" and "CHILDREN." Sub-topic "EDUCATIONAL" is broken down into sub-topics "EARLY LEARNING," "GRADES 3–6," "MIDDLE SCHOOL," "HIGH SCHOOL" and "COLLEGE."

Icons are provided next to selected subtopics, each indicating that a supplemental article is available corresponding to the particular subtopic within the base article. As described above, the icons provide information as to the supplemental article type, supplemental article author and difficulty level. Difficulty level is indicated by the color of the icon background, and is not apparent on the black-and-white FIG. 3. FIG. 3 illustrates the icon "EXPERT CS" next to the sub-topic "GENERAL COMMENTARY," the icon "EXPERT AA" next to the sub-topic "REFERENCE," the icons "BOOK1 CS" and "BOOK2 CS" next to the sub-topic "ADULT" under "ENCYCLOPEDIA," etc.

To the right of the list of subtopics is provided a supplemental article display box which is empty in FIG. 3 because a supplemental article has not been selected. At the right of supplemental article display box is a scroll icon which permits a user to scroll upward and downward to view all portions of a supplemental article. At the top of the supplemental article display box is a small "GO" icon box which will be described in detail with reference to FIGS. 6 and 7. A user of the enhanced encyclopedia invention optionally uses a keyboard, a mouse, a light pen, a microphone or any other input device to make supplemental article icon selections and to manipulate the display in any manner.

Still referring to FIG. 3, icon "EXPERT AA" identifies a supplemental article in the database of articles. The term "EXPERT" indicates that the supplemental article is a commentary written by an expert. The letters "AA" represent the initials of the expert who authored the corresponding supplemental article. Finally, the background color green (not shown) indicates that the corresponding supplemental article is written at the high school level. As further illustration, "BOOK2" in the icon "BOOK2 CS" next to sub-topic "REFERENCE SUITES" indicates that the corresponding supplemental article is a review, summary or explanation or other relevant information regarding the second book cited under base article "CD-ROM." In this icon, the letters "CS" are the initials of the book author or expert and the color green of the icon background (not shown) indicates that the book is written on a high school level. The preferred display shown in FIG. 3 also indicates that icons exist for supplemental articles regarding magazines (i.e., "MAG1 AA"). Although not shown, "JOURN1" in an icon would indicate that the independent work cited in the supplemental article is a journal and "NEWS1" in an icon would indicate that the independent work cited in the supplemental article is a newspaper or other news report.

FIG. 4 illustrates the display sample shown in FIG. 3, wherein the icon "EXPERT CS" next to the subtopic "GENERAL COMMENTARY" has been selected by a system user. This icon indicates that the corresponding supplemental article is authored by an expert having initials C.S. and the yellow icon background (not shown) indicates that the supplemental article is written on the elementary school level. Selection of the icon by the system user causes the text of the supplemental article to appear in the supplemental article display box. The supplemental article displayed in FIG. 4 is a short commentary of general nature describing CD-ROMs. It is apparent that this supplemental article is written, for example, for elementary school students.

The scroll icon at the right side of the supplemental article display box would permit a user to scroll downward if the supplemental article could not fit within the display box, not the case here. Upward and downward scroll icons at the top right of the screen display permit a user to scroll upward and downward to view additional information. For example, additional subtopics optionally exist for the base article shown in FIG. 4 and the user may use the downward scroll icon to access the additional sub-topics.

FIG. 5 illustrates the display sample shown in FIG. 3, wherein the icon "EXPERT AA" next to the subtopic "REFERENCE" has been selected by a system user. This icon indicates that the corresponding supplemental article is written by an expert having initials A.A. and the green icon background (not shown) indicates a high school level. In the supplemental article display box is presented the corresponding supplemental article text. Note that the supplemental article text could not all fit within the display box, requiring the user to use the downward scroll icon to view the remainder of the text.

FIG. 6 illustrates the sample display shown in FIG. 3, wherein the icon "BOOK1 CS" corresponding to sub-topic "ADULT" below "ENCYCLOPEDIAS" has been selected. This icon indicates that the corresponding supplemental article is a review, summary or explanation or other information relating to a book (the first book cited in base article "CD-ROM") written by an author having the initials C.S. The green icon background (not shown) indicates that this book is appropriate for a high school student, for example.

The text shown in the supplemental article display box in FIG. 6 is different from that shown in FIGS. 4 and 5 because supplemental article is a review of a book titled *Que's 1995 CD-ROM Buyer's Guide.* This supplemental article lists, after naming the book reviewed, the pages of the book that correspond to the sub-topic "ADULT" under "ENCYCLOPEDIAS." After the suggested pages, the supplemental article indicates that paid access to the suggested pages is available. The availability of paid access to the book is also indicated to the encyclopedia user by activation of the "GO" icon above the supplemental article display box. The limitation of a supplemental article and corresponding independent work to specific pages saves user paid-access cost (if required) and directs user attention to relevant passages.

Paid access to an independent work reviewed in a supplemental article is obtained in many possible ways. Access is optionally provided by directing the user to an on-line database service so that the user can "go on-line" to access the independent work. Access is also optionally provided by means of an encryption system, wherein the independent work or portions of the work are provided on a memory in the user's possession (i.e., on a CD-ROM), and the user acquires and enters a code to view the encrypted data. Other free or paid-access systems are of course contemplated.

FIG. 7 illustrates the display sample shown in FIG. 6 wherein the "GO" icon has been selected by a user to view the independent work reviewed in the supplemental article. The selection of the "GO" icon causes display in the supplemental article display box of the independent work cited in the supplemental article. For example, the supplemental article display box in FIG. 7 presents the pages described in the display of FIG. 6. The encyclopedia user optionally scrolls downward to view more of the independent work. The example shown in FIG. 7 is a quote from *Que's 1995 CD-ROM BUYER'S GUIDE,* at page 68.

FIG. 8 illustrates a preferred "form" for the sample display shown in FIGS. 3–7. The form defines the appearance of the information display for each base article. Accordingly, each base article will have its own form. Appendix D provides the source code commands optionally stored in CD-ROM 20 or elsewhere for creating the form shown in FIG. 8. The commands shown in Appendix B are in the Visual Basic programming language, often referred to as V-Basic. It is also contemplated that the form for each base article can be very different from that shown in FIG. 8 or may optionally vary from one base article to the next. Also, it is contemplated that any program language can be used to create the forms. V-Basic is only one example of such a language. Referring to Appendix D, commands are provided for defining the locations, sizes, fonts, text, back color and other aspects for the captions, textual matter, subtopics and icons shown in the FIG. 8.

Appendix C provides source code commands in V-Basic for inserting the text of supplemental articles into a form such as the one shown in FIG. 8. For example, subroutine "Sub Label7_Click ()" shown in Appendix C provides the text of a supplemental article corresponding to the icon labeled "EXPERT AA." The text defined in this subroutine appears in the supplemental article display box in FIG. 5, which illustrates the sample display when the icon "EXPERT AA" has been selected. When icon "EXPERT AA" is selected, the supplemental article display box is filled with the text shown in the code. Subroutine "Sub Label15_ Click()" provides the test of a supplemental article corresponding to the icon "BOOK1 CS". When the icon "BOOK1 CS" is selected, two things happen. First, the supplemental article display box on the form is filled with the text shown in quotes. Second, the "GO" icon is activated to indicate to the user that the icon can be selected to access the independent work cited in the supplemental article.

The database of articles according to this invention provides several significant benefits. Generally, the database of articles provides a large selection of relevant material because the important and popular articles are selected for expansion. The database of articles, which preferably includes icons, makes it possible for an encyclopedia user to identify supplemental articles of an appropriate difficulty level, of a desired type and authored by a desired expert or author. Also, a user is optionally provided with access to the objective ratings (preferably importance and popularity ratings) to guide the user in the emphasis of encyclopedic articles. For example, a schoolteacher could use the objective ratings to select base articles for emphasis in the teaching environment.

The preferred contents of the database of articles also make it possible to monitor and update the preferences of a particular user. In other words, a profile or "silhouette" of a particular user is optionally maintained. Such a silhouette permits the enhanced electronic encyclopedia according to this invention to "filter away" articles that would not be of interest to a particular user or to bring attention to articles anticipated to be of particular interest to a user.

Figure 9:
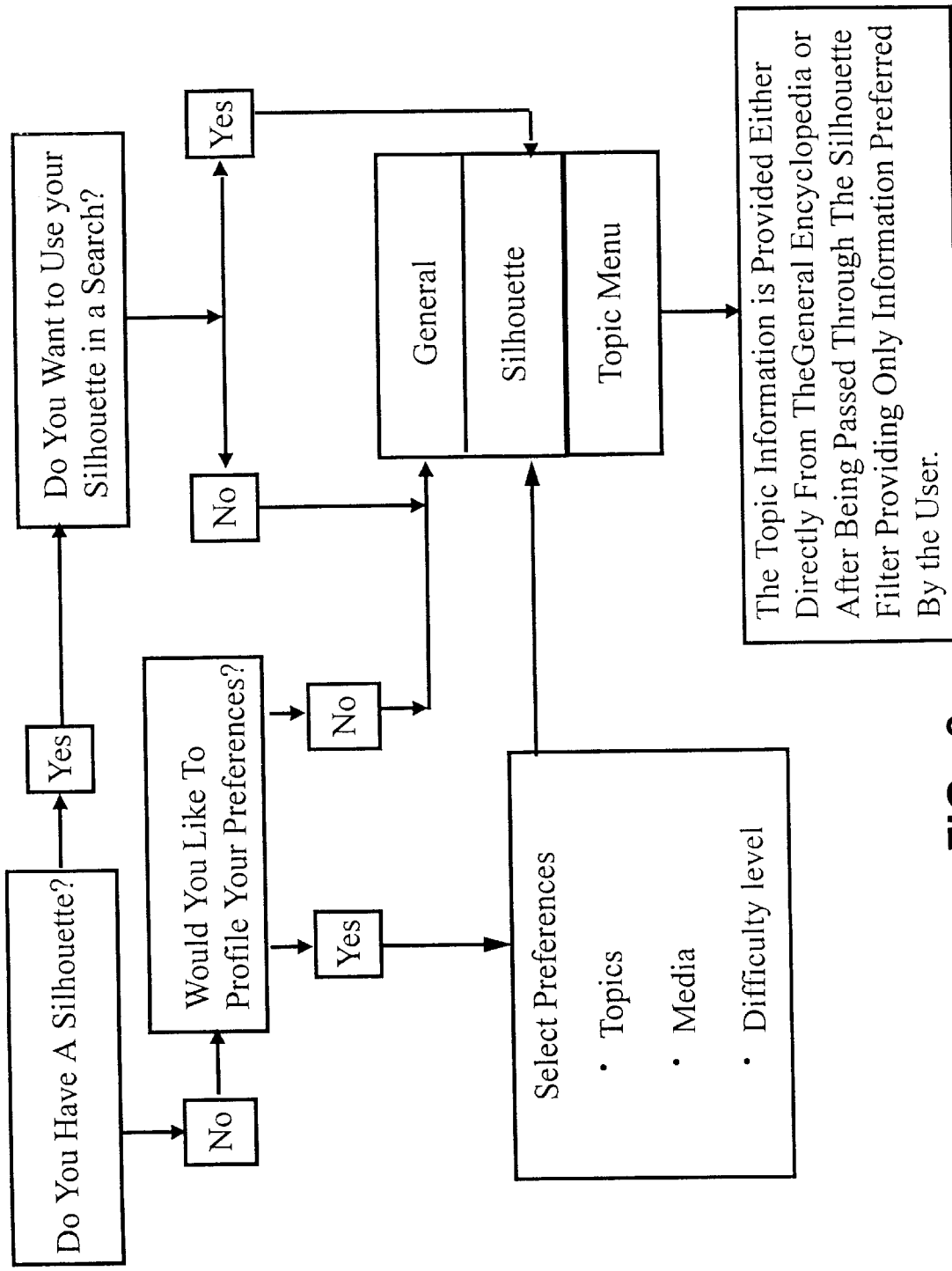
FIG. 9 is a flow diagram illustrating the logic for one embodiment of a silhouette module according to this invention.

Such a feature is preferably accomplished by providing a "silhouette module," optionally stored in CD-ROM 20 or elsewhere. The logic of one embodiment of a silhouette module is provided in flow diagram form in FIG. 9. The logic of the silhouette module depends upon whether a particular user already has a "silhouette." If the user does have a saved silhouette, the user is asked whether he or she wishes to use the silhouette while conducting a search for encyclopedic articles. If yes, then topic information such as base article titles, subtopics and icons corresponding to supplemental articles are provided after being passed through a "silhouette filter" to remove from the encyclopedia menus those base articles, subtopics and supplemental articles that are anticipated not to be of interest to the user. If the user does not wish to use the silhouette function for a search, the user is simply provided access to the general topic menus.

If a particular user does not have a silhouette, the module asks whether he or she would like to profile preferences. If no, the user is provided access to a general topic menu. If yes, the user is asked to select preferences as to topics (i.e., base articles, subject areas covering multiple base articles or other similar information), article media (i.e., supplemental articles selected from journals, magazines, lectures, books, newspapers or other sources) and difficulty level (i.e., grade level or knowledge level). From this information, the profile or silhouette of the user is created and topic information is passed through a silhouette filter to remove topics likely not to be of interest to the particular user.

Another feature made possible by the preferred database of articles according to this invention is the ability to update a particular user profile or silhouette based upon actual user selections monitored by the enhanced electronic encyclopedia. This feature allows the system to vary or modify the user profile or silhouette as the user's knowledge level, interests and needs change over time.

Figure 10:
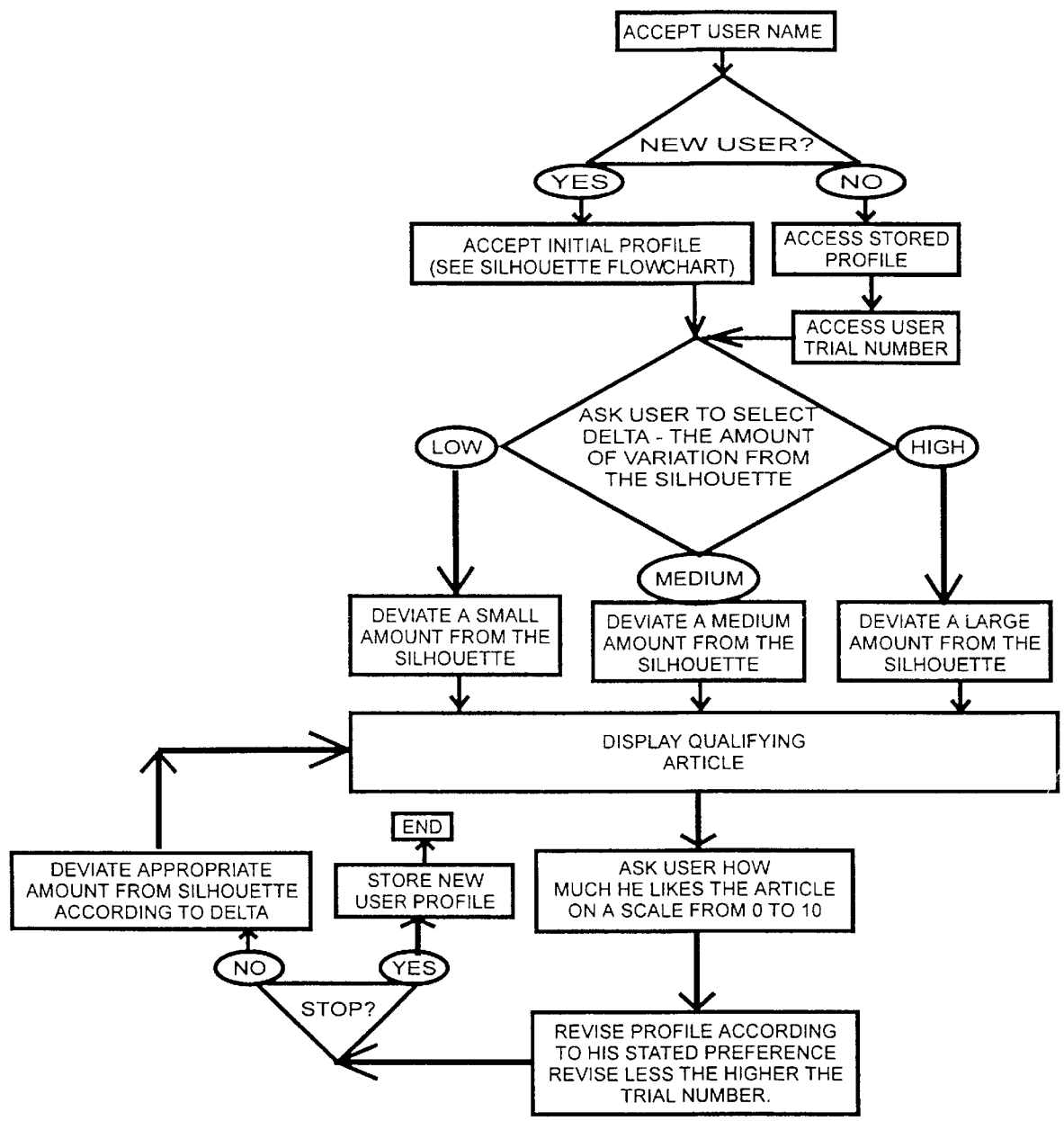
FIG. 10 is a flow diagram illustrating the logic for one embodiment of an interactive agent module according to this invention.

In order to accomplish this benefit, an interactive agent is preferably provided. FIG. 10 illustrates a flow diagram for a preferred interactive agent module (optionally stored in CD-ROM 20 or elsewhere) adapted for use with an enhanced electronic encyclopedia according to this invention. The purpose of the interactive agent module, as will become clear from the description of the logic shown in FIG. 10, is to guide an encyclopedia user to material he or she is likely to enjoy and to present the user with selections slightly outside the user's stated preferences so as to modify the preferences interactively.

Referring to FIG. 10, the preferred interactive agent module accepts a particular user name and asks the user whether or not he or she is a new encyclopedia user. The interactive agent module will accept an initial profile using the silhouette module described with reference to FIG. 9 if the user is a new user. The interactive agent module will access a stored profile and a user "trial number" if the user is not a new user. The "trial number" is preferably the number of times that particular user has performed a search.

The interactive agent module then asks the system user to select a "delta," or the desired amount of variation from preferences stored in the existing profile or silhouette. The user is asked to select between a "low," a "medium" and a "high" delta. For purposes of illustration, each silhouette optionally includes four preferences, including topic area, difficulty level, supplemental article type and expert or author name.

The topic area preference relates to general topics such as biology, chemistry, history, etc. A low delta from the preferred topic area "biology" would be, for example, to those of the life sciences such as botany or anatomy. A medium delta from "biology" would be to one of the general sciences such as physics or chemistry. A high delta would be from "biology" to any topic area.

The difficulty level preference of a user includes, for example, education level. A low delta optionally maintains the same education level. A medium delta would change the education level up or down one level (i.e., from "middle school" to "high school"). A high delta would change the grade level or education level to any level.

The supplemental article type preference of a user profile relates to sources including magazines, lectures, books, journals, newspapers, etc. A low delta optionally provides no change in article type, whereas a medium or high delta would then include any source.

The expert or author name preference indicates a preference to one or more experts listed by initials in the database of articles. A low delta would optionally cause no change in the expert or author name selection. A medium delta would optionally make no change during one half of the user trials (encyclopedia uses), a change to different experts being affected for the remaining one-half of the trials. A high delta, on the other hand, optionally opens the selection to any expert or author in the database of articles.

Accordingly, returning to FIG. 10, when "high" is selected, the user search is permitted to deviate a large amount from the user silhouette, as defined above. Similarly, selection of "medium" and "low" deltas bring about medium and small deviations, respectively.

The interactive agent module then displays a qualifying article. The user is then asked to rate how much he or she likes the article on a scale from, for example, zero to ten. The interactive agent module then revises the user profile according to the user's article rating. The revision is less dramatic as the trial number (or number of uses) by a particular user increases.

Finally, if the user wishes to end his or her search, the revised user profile is stored in a memory and the module is ended. If the user wishes to continue, the search is again conducted based on the revised silhouette and a new qualifying article is displayed.

The specific embodiments of the enhanced electronic encyclopedia shown and described herein are provided merely for the purposes of illustration. Many modifications to the embodiments shown and described are optionally made without departing from the scope and spirit of this invention.

Many modifications are optionally made to the hardware, software, database and other aspects of this invention. For example, the system hardware can be modified to employ any component or components capable of performing functions similar to those described herein. The software can be modified to include any programming language or logic capable of achieving substantially the same benefits as those described. The database optionally includes additional information of any sort and can be replaced entirely with information of a different nature for different uses. Other modifications may be made as desired.

The enhanced electronic encyclopedia of this invention is preferably created by (1) forming a database of articles; (2) storing the database of articles in one or more memories; (3) connecting to a memory a processor capable of manipulating the database of articles; (4) connecting to the processor an input device capable of receiving information from an encyclopedia user; and (5) connecting to the processor an output device capable of communicating information to the encyclopedia user.

The database of articles is preferably formed by (1) providing base articles having an article title and an article text; (2) assigning an objective rating to each base article; (3) selecting from the base articles those base articles having a selected objective rating; (4) providing supplemental articles for each selected base article; and (5) assigning an icon or symbol to each supplemental article.

In any embodiment, an enhanced electronic encyclopedia and method according to this invention confers several benefits. For example, this invention provides an enhanced encyclopedia in which selected articles are expanded to increase the depth of available information. Also, a database of articles adapted for use with this invention makes it possible to accommodate particular user preferences. Such a database of articles is capable of supporting optional features such as information screening based on user preferences, creating and interactively updating user profiles and directing user attention to information likely to be of interest to the user.

EMC: TB749066604US

APPENDIX A

|   |                                  | CUMULATIVE | PERCENTAGE |     |
|---|----------------------------------|--------|---------|-----|
| 1 | United States OR America         | 5,150  | 5,150   | 15% |
| 2 | United Kingdom, Britain, England | 3,462  | 8,612   | 25% |
| 3 | France                           | 2,183  | 10,795  | 31% |
| 4 | Germany                          | 1,554  | 12,349  | 36% |
| 5 | Italy                            | 1,285  | 13,634  | 39% |
| 6 | USSR OR Russia                   | 989    | 14,623  | 42% |
| 7 | Canada                           | 980    | 15,603  | 45% |
| 8 | Spain                            | 944    | 16,547  | 48% |
| 9 | India                            | 908    | 17,455  | 50% |
| 10 | China                           | 846    | 18,301  | 53% |
| 11 | Mexico                          | 758    | 19,059  | 55% |
| 12 | Japan                           | 637    | 19,696  | 57% |
| 13 | Egypt                           | 630    | 20,326  | 59% |
| 14 | Greece                          | 516    | 20,842  | 60% |
| 15 | South Africa                    | 509    | 21,351  | 62% |
| 16 | Austria                         | 468    | 21,819  | 63% |
| 17 | Netherlands                     | 457    | 22,276  | 64% |
| 18 | Australia                       | 456    | 22,732  | 66% |
| 19 | Turkey                          | 436    | 23,168  | 67% |
| 20 | Ireland                         | 415    | 23,583  | 68% |
| 21 | Poland                          | 365    | 23,948  | 69% |
| 22 | Switzerland                     | 350    | 24,298  | 70% |
| 23 | Israel                          | 345    | 24,643  | 71% |
| 24 | Sweden                          | 298    | 24,941  | 72% |
| 25 | Brazil                          | 297    | 25,238  | 73% |
| 26 | Belgium                         | 270    | 25,508  | 74% |
| 27 | Hungary                         | 266    | 25,774  | 75% |
| 28 | Syria                           | 245    | 26,019  | 75% |
| 29 | Norway                          | 229    | 26,248  | 76% |
| 30 | Portugal                        | 228    | 26,476  | 77% |
| 31 | Denmark                         | 227    | 26,703  | 77% |
| 32 | Iran                            | 224    | 26,927  | 78% |
| 33 | Vietnam                         | 200    | 27,127  | 78% |
| 34 | Philippines                     | 187    | 27,314  | 79% |
| 35 | Guinea                          | 174    | 27,488  | 79% |
| 36 | New Zealand                     | 174    | 27,662  | 80% |
| 37 | Peru                            | 171    | 27,833  | 80% |
| 38 | Argentina                       | 169    | 28,002  | 81% |
| 39 | Cuba                            | 164    | 28,166  | 81% |
| 40 | Indonesia                       | 164    | 28,330  | 82% |
| 41 | Iraq                            | 160    | 28,490  | 82% |
| 42 | Korea                           | 140    | 28,630  | 83% |
| 43 | Romania                         | 137    | 28,767  | 83% |
| 44 | Chile                           | 135    | 28,902  | 84% |
| 45 | Jordan                          | 128    | 29,030  | 84% |

| 46 | Pakistan | 127 | 29,157 | 84% |
|----|----------|-----|--------|-----|
| 47 | Venezuela | 112 | 29,269 | 85% |
| 48 | Finland | 107 | 29,376 | 85% |
| 49 | Panama | 107 | 29,483 | 85% |
| 50 | Iceland | 106 | 29,589 | 86% |
| 51 | Afghanistan | 104 | 29,693 | 86% |
| 52 | Commonwealth of Independent States | 102 | 29,795 | 86% |
| 53 | Ethiopia | 102 | 29,897 | 86% |
| 54 | Morocco | 99 | 29,996 | 87% |
| 55 | Yugoslavia | 99 | 30,095 | 87% |
| 56 | Central African Republic | 93 | 30,188 | 87% |
| 57 | Greenland | 93 | 30,281 | 88% |
| 58 | Bulgaria | 91 | 30,372 | 88% |
| 59 | Algeria | 86 | 30,458 | 88% |
| 60 | Saudi Arabia | 86 | 30,544 | 88% |
| 61 | Sudan | 86 | 30,630 | 89% |
| 62 | Thailand | 80 | 30,710 | 89% |
| 63 | Colombia | 79 | 30,789 | 89% |
| 64 | Sri Lanka | 79 | 30,868 | 89% |
| 65 | Nigeria | 78 | 30,946 | 89% |
| 66 | Bolivia | 77 | 31,023 | 90% |
| 67 | Lebanon | 77 | 31,100 | 90% |
|  |  |  |  |  |
| 68 | Congo | 76 | 31,176 | 90% |
| 69 | Libya | 75 | 31,251 | 90% |
| 70 | Taiwan | 74 | 31,325 | 91% |
| 71 | Luxembourg | 72 | 31,397 | 91% |
| 72 | Zaire | 72 | 31,469 | 91% |
| 73 | Cyprus | 69 | 31,538 | 91% |
| 74 | Lithuania | 69 | 31,607 | 91% |
| 75 | Niger | 68 | 31,675 | 92% |
| 76 | Ecuador | 65 | 31,740 | 92% |
| 77 | Malaysia | 63 | 31,803 | 92% |
| 78 | Tanzania | 60 | 31,863 | 92% |
| 79 | Ghana | 57 | 31,920 | 92% |
| 80 | Jamaica | 57 | 31,977 | 92% |
| 81 | Zimbabwe | 57 | 32,034 | 93% |
| 82 | Nicaragua | 56 | 32,090 | 93% |
| 83 | Guatemala | 56 | 32,146 | 93% |
| 84 | Madagascar | 56 | 32,202 | 93% |
| 85 | Tunisia | 53 | 32,255 | 93% |
| 86 | Mongolia | 52 | 32,307 | 93% |
| 87 | Paraguay | 52 | 32,359 | 94% |
| 88 | Albania | 51 | 32,410 | 94% |
| 89 | Vatican City | 51 | 32,461 | 94% |
| 90 | Singapore | 49 | 32,510 | 94% |
| 91 | Uruguay | 49 | 32,559 | 94% |
| 92 | Zambia | 49 | 32,608 | 94% |
| 93 | Dominican Republic | 48 | 32,656 | 94% |

| | | | | |
|---|---|---|---|---|
| 94 | Kenya | 48 | 32,704 | 95% |
| 95 | Haiti | 46 | 32,750 | 95% |
| 96 | Mozambique | 46 | 32,796 | 95% |
| 97 | Estonia | 45 | 32,841 | 95% |
| 98 | Uganda | 44 | 32,885 | 95% |
| 99 | El Salvador | 43 | 32,928 | 95% |
| 100 | Kuwait | 42 | 32,970 | 95% |
| 101 | Laos | 42 | 33,012 | 95% |
| 102 | Cambodia | 40 | 33,052 | 96% |
| 103 | Georgia, Republic of | 40 | 33,092 | 96% |
| 104 | Honduras | 40 | 33,132 | 96% |
| 105 | Mali | 38 | 33,170 | 96% |
| 106 | Yemen | 38 | 33,208 | 96% |
| 107 | Angola | 37 | 33,245 | 96% |
| 108 | Cameroon | 35 | 33,280 | 96% |
| 109 | Latvia | 35 | 33,315 | 96% |
| 110 | Senegal | 35 | 33,350 | 96% |
| 111 | Solomon Islands | 35 | 33,385 | 97% |
| 112 | Western Sahara | 35 | 33,420 | 97% |
| 113 | Nepal | 34 | 33,454 | 97% |
| 114 | Somalia | 34 | 33,488 | 97% |
| 115 | Bangladesh | 33 | 33,521 | 97% |
| 116 | Costa Rica | 32 | 33,553 | 97% |
| 117 | Malta | 30 | 33,583 | 97% |
| 118 | Bermuda | 29 | 33,612 | 97% |
| 119 | Chad | 29 | 33,641 | 97% |
| 120 | Sierra Leone | 29 | 33,670 | 97% |
| 121 | Papua New Guinea | 28 | 33,698 | 97% |
| 122 | United Arab Emirates | 28 | 33,726 | 98% |
| 123 | Namibia | 27 | 33,753 | 98% |
| 124 | Netherlands Antilles | 27 | 33,780 | 98% |
| 125 | Benin | 26 | 33,806 | 98% |
| 126 | Guyana | 26 | 33,832 | 98% |
| 127 | Botswana | 23 | 33,855 | 98% |
| 128 | Oman | 23 | 33,878 | 98% |
| 129 | Equatorial Guinea | 22 | 33,900 | 98% |
| 130 | Ivory Coast | 22 | 33,922 | 98% |
| 131 | Antigua and Barbuda | 20 | 33,942 | 98% |
| 132 | Mauritania | 20 | 33,962 | 98% |
| 133 | Mauritius | 20 | 33,982 | 98% |
| 134 | Bahama Islands | 19 | 34,001 | 98% |
| 135 | Barbados | 19 | 34,020 | 98% |
| 136 | Gabon | 19 | 34,039 | 98% |
| 137 | Grenada | 19 | 34,058 | 98% |
| 138 | Malawi | 19 | 34,077 | 99% |
| 139 | Togo | 19 | 34,096 | 99% |
| 140 | Burkina Faso | 18 | 34,114 | 99% |
| 141 | Fiji | 18 | 34,132 | 99% |

| 142 | Cape Verde | 17 | 34,149 | 99% |
|---|---|---|---|---|
| 143 | Liberia | 17 | 34,166 | 99% |
| 144 | Brunei | 16 | 34,182 | 99% |
| 145 | Djibouti | 16 | 34,198 | 99% |
| 146 | Suriname | 16 | 34,214 | 99% |
| 147 | Belize | 15 | 34,229 | 99% |
| 148 | Dominica | 15 | 34,244 | 99% |
| 149 | Rwanda | 15 | 34,259 | 99% |
| 150 | Saint Lucia | 15 | 34,274 | 99% |
| 151 | San Marino | 15 | 34,289 | 99% |
| 152 | Myanmar | 14 | 34,303 | 99% |
| 153 | Burundi | 14 | 34,317 | 99% |
| 154 | Comoros | 14 | 34,331 | 99% |
| 155 | Monaco | 14 | 34,345 | 99% |
| 156 | Myanmar | 14 | 34,359 | 99% |
| 157 | Kiribati | 13 | 34,372 | 99% |
| 158 | Lesotho | 13 | 34,385 | 99% |
| 159 | Bhutan | 12 | 34,397 | 99% |
| 160 | Gambia | 12 | 34,409 | 99% |
| 161 | Liechtenstein | 12 | 34,421 | 100% |
| 162 | Qatar | 12 | 34,433 | 100% |
| 163 | Tonga | 12 | 34,445 | 100% |
| 164 | Trinidad and Tobago | 12 | 34,457 | 100% |
| 165 | Bahrain | 11 | 34,468 | 100% |
| 166 | Micronesia, Fed. States of | 11 | 34,479 | 100% |
| 167 | Western Samoa | 11 | 34,490 | 100% |
| 168 | Vanuatu | 10 | 34,500 | 100% |
| 169 | Saint Kitts-Nevis | 9 | 34,509 | 100% |
| 170 | Saint Vincent and the Grenadines | 9 | 34,518 | 100% |
| 171 | Sao Tome and Principe | 9 | 34,527 | 100% |
| 172 | Swaziland | 9 | 34,536 | 100% |
| 173 | Guinea-Bissau | 8 | 34,544 | 100% |
| 174 | Seychelles | 8 | 34,552 | 100% |
| 175 | Buganda | 7 | 34,559 | 100% |
| 176 | Andorra | 6 | 34,565 | 100% |
| 177 | Aruba | 5 | 34,570 | 100% |
| 178 | Maldives, Republic of | 5 | 34,575 | 100% |
| 179 | Nauru | 5 | 34,580 | 100% |
| 180 | Anguilla | 4 | 34,584 | 100% |
| | TOTAL | | 34,584 | |

EMC: TB749066604US

APPENDIX B

| | | | | | |
|---|---|---|---|---|---|
| UNITED STATES | 9,945 | APPLE COMPUTER | 923 | GEORGE FOREMAN | 38 |
| CLASSICAL MUSIC | 6,721 | CIVIL RIGHTS | 918 | JULIA ROBERTS | 36 |
| AUTOMOBILES | 6,342 | WELFARE | 877 | | |
| BILL CLINTON | 5,415 | ABORTION | 866 | | |
| UNITED KINGDOM | 4,966 | UNEMPLOYMENT | 850 | | |
| CANADA | 4,017 | O.J. SIMPSON | 828 | | |
| ACQUISITIONS AND MERGERS | 3,247 | ASIA | 811 | | |
| CALIFORNIA | 3,205 | BLACK HISTORY | 797 | | |
| BASEBALL | 3,035 | VIRGINIA | 794 | | |
| ECONOMIC INDICATORS | 2,539 | WASHINGTON D.C. | 785 | | |
| GOLF | 2,401 | INTERNET | 779 | | |
| FRANCE | 2,327 | AEROSPACE | 774 | | |
| AIDS | 2,282 | ANTHROPOLOGY | 754 | | |
| CD-ROM | 2,203 | DNA | 731 | | |
| BASKETBALL | 2,114 | FIREARMS | 721 | | |
| CHINA | 2,074 | USSR | 712 | | |
| WINES | 2,062 | ENCYCLOPEDIA | 701 | | |
| GERMANY | 2,047 | CHILD ABUSE AND NEGLECT | 667 | | |
| CONGRESS | 1,965 | ENDANGERED SPECIES | 657 | | |
| GAYS AND LESBIANS | 1,955 | ACCOUNTING | 629 | | |
| GENERAL MOTORS | 1,926 | CORRUPTION IN GOVERNMENT | 615 | | |
| GARDENING | 1,907 | DICTIONARIES | 601 | | |
| MUTUAL FUNDS | 1,839 | BALLET | 577 | | |
| BIOLOGY | 1,725 | ARMS | 560 | | |
| AFRICA | 1,697 | AGING AND LONGEVITY | 559 | | |
| DO-IT-YOURSELF | 1,644 | BREAST CANCER | 548 | | |
| ARCHITECTURE | 1,601 | ARCHEOLOGY | 530 | | |
| FEDERAL BUDGET | 1,593 | FDA | 528 | | |
| ASTRONOMY | 1,508 | HILLARY CLINTON | 513 | | |
| BOSNIA-HERZEGOVINA | 1,499 | BALANCE OF TRADE | 499 | | |
| COUNTRY MUSIC | 1,497 | NEWT GINGRICH | 492 | | |
| WORLD WAR II | 1,417 | TRANSPLANTS | 433 | | |
| MULTIMEDIA | 1,317 | DIABETES | 426 | | |
| COMPUTER AND VIDEO GAMES | 1,306 | DOMESTIC VIOLENCE | 422 | | |
| ENGLAND | 1,204 | AIR POLLUTION | 323 | | |
| CHRISTIANITY | 1,277 | ADOPTION | 264 | | |
| DATA BASES | 1,220 | ABC | 259 | | |
| UNITED NATIONS | 1,211 | VIRTUAL REALITY | 233 | | |
| CATHOLICISM | 1,154 | ALZHEIMERS | 217 | | |
| AUTO INDUSTRY | 1,109 | MICHAEL JORDAN | 183 | | |
| COMPUTER GRAPHICS | 1,082 | ROBERT DOLE | 182 | | |
| COLLEGE FOOTBALL | 1,042 | DERIVATIVES | 169 | | |
| CELLULAR BIOLOGY | 1,031 | ACADEMY AWARDS | 163 | | |
| DIET | 1,027 | NICOLE BROWN SIMPSON | 141 | | |
| CHRYSLER CORP | 999 | COCAINE | 122 | | |
| FLORIDA | 978 | ADULTERY | 117 | | |
| CARDIOVASCULAR DISEASE | 949 | STEVEN SPIELBERG | 103 | | |
| CABLE TV | 942 | OPRAH WINFREY | 91 | | |
| CHRISTMAS | 938 | MIKE TYSON | 39 | | |

EMC: TB749066604US

APPENDIX C

Sub Label7_Click ()
rem - icon labeled EXPERT AA when clicked on the text shown below
rem - appears in the text box.
text1.Text = "Reference works are what CD-ROMs are all about: one compact disc containing everything you need to know, with all the facts, figures, maps, and other data, for a specific area of knowledge. Encyclopedias are very popular.
Microsoft's Encarta is a dazzling new multimedia encyclopedia. Most reviewers agree that if you can only find room for one reference CD-ROM, Microsoft Bookshelf is the one you should have. It is a collection of seven reference works that are commonly found on one's bookshelf. Other reference works of note include atlases, including 'Street Atlas USA', which lets you zoom in to incredible levels of magnification to find any street in the USA. There's also 'CNN Global View', an atlas that spices up its maps with video clips from the recent past. 'Expert Astronomer' is your planetarium-on-disc when you need a reference work to the heavens."
label17.Caption = ""
End Sub Sub Label15_Click ()
rem - Icon labeled BOOK1 CS when clicked on this icon displayed the text
rem - shown below in the text box.. The GO icon (label 17) is activated, so
rem - that the user can read the source material by clicking on GO if he so
rem - desires
text1.Text = "Review of Que's 1995 CD-ROM Buyer's Guide pgs 68-69, 84-85,88-89 press GO button for paid access. Que gives a balanced assessment of three major encyclopedias Microsoft's Encarta, Compton's, and Grolier's. They gave a four disk rating to both Compton's and Encarta, and a 3 1/2 disk rating to Grolier's. However, it is Grolier's and Encarta that receive Que's editor's choice star. The reviewers say that Encarta (1994) takes the prize for multimedia effects and a slick interface. It is flashy and fun to use. Grolier's strength is it has a depth to its articles that you wont find elsewhere. Compton's combines some of the best features of both of them. Compton's has an especially nice searching engine in InfoPilot - that has five individual windows that can display a group of related articles at the same time.ay that you can't go wrong with any of the three."
label17.Caption = "GO"
End Sub

-29-

```
Sub Label3_Click ()
rem - icon labeled EXPERT CS when clicked on the text shown below appears
rem - in the text box.
text1.Text = "CD-ROMs are compact disks just like the music disks you're familar
with. They can hold more than 600,000 pages of information! CD-ROM software
can do many exicting things. A CD-ROM encyclopedia can be a marvelous
multimedia experience, with lots of pictures, film clips, and sound effects. Once
you use one you may never be able to go back to a plain, old text encyclopedia.
Also, there are lots of fun games available on CD-ROM software that give you lots
of graphics. In addition, there are CD-ROMs that can actually make learning fun!"
label17.Caption = ""
End Sub Sub Label17_Click ()
rem - icon labeled GO when BOOK1 CS is selected. its location is the little
rem - rectangle on top of the big rectangle. When clicked on, the text shown
rem - below appears in the text box. The text is the original source material.
text1.Text = "Compton's Interactive Encyclopedia for Windows  Rating four disks
software requirements MPC  Suggested Retail price $99. Compton's and I go way
back. I used a Compton's Encyclopedia all through high school and college at
home (this 35-year old set is still on the shelves at my Mom's house). I strayed for
awhile in the mid-1970s with a tempting $1.99 a volume deal for a Funk and
Wagnalls edition (now augmented with 17 year-books). I returned to the fold last
year when I purchased Compton's Multimedia Encyclopedia ( the predecessor to
this one) for $129.00. It seemed like a bargain at the time. But, if you want to talk
about bargains, look at what you can get today. For a $99 street price you can
purchase the latest Compton's on disc."
End Sub
```

EMC: TB749066604US

APPENDIX D

BRADE.FRM - 1

```
VERSION 2.00
Begin Form Form1
    Caption         =   "ENCYCLOPEDIA EXPANSION PROGRAM"
    ClientHeight    =   5820
    ClientLeft      =   1725
    ClientTop       =   2280
    ClientWidth     =   7365
    Height          =   6225
    Left            =   1665
    LinkTopic       =   "Form1"
    ScaleHeight     =   5820
    ScaleWidth      =   7365
    Top             =   1935
    Width           =   7485
    Begin TextBox Text1
        FontBold        =   -1   'True
        FontItalic      =   0    'False
        FontName        =   "MS Sans Serif"
        FontSize        =   9.75
        FontStrikethru  =   0    'False
        FontUnderline   =   0    'False
        Height          =   4935
        Left            =   5040
        MultiLine       =   -1   'True
        ScrollBars      =   2    'Vertical
        TabIndex        =   3
        Top             =   1920
        Width           =   4335
    End
    Begin Label Label43
        BackColor       =   &H00FFFF00&
        Caption         =   "BOOK2 CS"
        Height          =   195
        Left            =   3000
        TabIndex        =   28
        Top             =   6600
        Width           =   975
    End
    Begin Label Label42
        BackColor       =   &H00FFFF00&
        Caption         =   "EXPERT AA"
        Height          =   195
        Left            =   1800
        TabIndex        =   29
        Top             =   6600
        Width           =   1095
    End
    Begin Label Label41
        BackColor       =   &H00FFFF00&
        Caption         =   "BOOK3 CS"
        Height          =   195
        Left            =   3240
        TabIndex        =   30
        Top             =   6360
        Width           =   975
    End
    Begin Label Label40
        BackColor       =   &H00FFFF00&
        Caption         =   "MAG2 AA"
```

-31-

BRADE.FRM - 2
```
         Height          =    195
         Left            =    2280
         TabIndex        =    43
         Top             =    6360
         Width           =    855
      End
      Begin Label Label39
         BackColor       =    &H00FFFF00&
         Caption         =    "MAG2 AA"
         Height          =    195
         Left            =    3720
         TabIndex        =    42
         Top             =    6120
         Width           =    855
      End
      Begin Label Label38
         BackColor       =    &H00FFFF00&
         Caption         =    "EXPERT CS"
         Height          =    195
         Left            =    2520
         TabIndex        =    41
         Top             =    6120
         Width           =    1095
      End
      Begin Label Label37
         BackColor       =    &H00FFFF00&
         Caption         =    "BOOK3 CS"
         Height          =    195
         Left            =    2640
         TabIndex        =    40
         Top             =    4920
         Width           =    975
      End
      Begin Label Label36
         BackColor       =    &H00FFFF00&
         Caption         =    "EXPERT AA"
         Height          =    195
         Left            =    2040
         TabIndex        =    39
         Top             =    5280
         Width           =    1095
      End
      Begin Label Label35
         BackColor       =    &H00FFFF00&
         Caption         =    "BOOK2 CS"
         Height          =    195
         Left            =    2640
         TabIndex        =    38
         Top             =    4680
         Width           =    975
      End
      Begin Label Label34
         BackColor       =    &H00FFFF00&
         Caption         =    "BOOK1 CS"
         Height          =    195
         Left            =    3360
         TabIndex        =    37
         Top             =    4320
         Width           =    975
```

```
BRADE.FRM - 3
   End
   Begin Label Label33
      BackColor       =   &H0080FFFF&
      Caption         =   "MAG3 AA"
      Height          =   195
      Left            =   3360
      TabIndex        =   36
      Top             =   5880
      Width           =   855
   End
   Begin Label Label32
      BackColor       =   &H00FFFF00&
      Caption         =   "MAG1 AA"
      Height          =   195
      Left            =   3840
      TabIndex        =   35
      Top             =   5640
      Width           =   855
   End
   Begin Label Label31
      BackColor       =   &H00FFFF00&
      Caption         =   "EXPERT AA"
      Height          =   195
      Left            =   2160
      TabIndex        =   34
      Top             =   5880
      Width           =   1095
   End
   Begin Label Label30
      BackColor       =   &H00FFFF00&
      Caption         =   "EXPERT AA"
      Height          =   195
      Left            =   2640
      TabIndex        =   33
      Top             =   5640
      Width           =   1095
   End
   Begin Label Label29
      BackColor       =   &H00FFFF00&
      Caption         =   "EXPERT AA"
      Height          =   195
      Left            =   1680
      TabIndex        =   32
      Top             =   4080
      Width           =   1095
   End
   Begin Label Label28
      BackColor       =   &H00FFFF00&
      Caption         =   "EXPERT CS"
      Height          =   195
      Left            =   2160
      TabIndex        =   31
      Top             =   4320
      Width           =   1095
   End
   Begin Label Label27
      Caption         =   "GENERAL COMMENTARY"
      Height          =   255
      Left            =   360
```

-33-

```
BRADE.FRM - 4
        TabIndex        =   27
        Top             =   1800
        Width           =   2295
    End
    Begin Label Label26
        BackColor       =   &H00FFFF00&
        Caption         =   "BOOK1 CS"
        Height          =   195
        Left            =   3240
        TabIndex        =   18
        Top             =   3480
        Width           =   975
    End
    Begin Label Label25
        BackColor       =   &H00FFFF00&
        Caption         =   "MAG1 AA"
        Height          =   195
        Left            =   2160
        TabIndex        =   26
        Top             =   3480
        Width           =   855
    End
    Begin Label Label24
        BackColor       =   &H00FFFFFF&
        Caption         =   "COLLEGE"
        Height          =   255
        Left            =   960
        TabIndex        =   25
        Top             =   6600
        Width           =   975
    End
    Begin Label Label23
        BackColor       =   &H00FFFFFF&
        Caption         =   "HIGH SCHOOL"
        Height          =   255
        Left            =   960
        TabIndex        =   24
        Top             =   6360
        Width           =   1335
    End
    Begin Label Label22
        BackColor       =   &H00FFFFFF&
        Caption         =   "MIDDLE SCHOOL"
        Height          =   255
        Left            =   960
        TabIndex        =   23
        Top             =   6120
        Width           =   1695
    End
    Begin Label Label21
        BackColor       =   &H00FFFFFF&
        Caption         =   " GRADES 3-6"
        Height          =   255
        Left            =   960
        TabIndex        =   22
        Top             =   5880
        Width           =   1335
    End
    Begin Label Label20
```

```
BRADE.FRM - 5
        BackColor       =   &H00FFFFFF&
        Caption         =   "EARLY LEARNING"
        Height          =   255
        Left            =   960
        TabIndex        =   21
        Top             =   5640
        Width           =   1695
     End
     Begin Label Label19
        BackColor       =   &H00FFFFFF&
        Caption         =   "EDUCATIONAL"
        Height          =   255
        Left            =   600
        TabIndex        =   20
        Top             =   5280
        Width           =   1335
     End
     Begin Label Label18
        BackColor       =   &H00FFFFFF&
        Caption         =   "OTHER REFERENCE"
        Height          =   195
        Left            =   720
        TabIndex        =   19
        Top             =   4920
        Width           =   1935
     End
     Begin Label Label17
        Alignment       =   2  'Center
        BorderStyle     =   1  'Fixed Single
        FontBold        =   -1  'True
        FontItalic      =   0  'False
        FontName        =   "MS Sans Serif"
        FontSize        =   12
        FontStrikethru  =   0  'False
        FontUnderline   =   0  'False
        Height          =   375
        Left            =   5400
        TabIndex        =   17
        Top             =   1560
        Width           =   615
     End
     Begin Label Label16
        BackColor       =   &H00FFFF00&
        Caption         =   "BOOK2 CS"
        Height          =   195
        Left            =   3240
        TabIndex        =   16
        Top             =   3240
        Width           =   975
     End
     Begin Label Label15
        BackColor       =   &H00FFFF00&
        Caption         =   "BOOK1 CS"
        Height          =   195
        Left            =   2040
        TabIndex        =   15
        Top             =   3240
        Width           =   975
     End
```

```
BRADE.FRM - 6
    Begin Label Label14
        BackColor       =   &H00FFFFFF&
        Caption         =   "REFERENCE SUITES"
        Height          =   195
        Left            =   720
        TabIndex        =   14
        Top             =   4680
        Width           =   2055
    End
    Begin Label Label13
        Caption         =   "CHILDREN'S"
        Height          =   195
        Left            =   960
        TabIndex        =   13
        Top             =   4320
        Width           =   1215
    End
    Begin Label Label12
        Caption         =   "ADULT"
        Height          =   195
        Left            =   960
        TabIndex        =   12
        Top             =   4080
        Width           =   735
    End
    Begin Label Label11
        BackColor       =   &H00FFFFFF&
        Caption         =   "DICTIONARIES"
        Height          =   195
        Left            =   720
        TabIndex        =   11
        Top             =   3840
        Width           =   1455
    End
    Begin Label Label10
        Caption         =   "CHILDREN'S"
        Height          =   255
        Left            =   960
        TabIndex        =   10
        Top             =   3480
        Width           =   1215
    End
    Begin Label Label9
        Caption         =   "ADULT"
        Height          =   255
        Left            =   960
        TabIndex        =   9
        Top             =   3240
        Width           =   735
    End
    Begin Label Label8
        BackColor       =   &H00FFFFFF&
        Caption         =   "ENCYCLOPEDIAS"
        Height          =   255
        Left            =   720
        TabIndex        =   8
        Top             =   3000
        Width           =   1575
    End
```

-36-

```
BRADE.FRM - 7
    Begin Label Label7
        BackColor       =   &H00FFFF00&
        Caption         =   "EXPERT AA"
        Height          =   195
        Left            =   1800
        TabIndex        =   7
        Top             =   2640
        Width           =   1095
    End
    Begin Label Label6
        BackColor       =   &H00FFFFFF&
        Caption         =   "REFERENCE"
        Height          =   255
        Left            =   600
        TabIndex        =   6
        Top             =   2640
        Width           =   1215
    End
    Begin Label Label5
        Caption         =   "EXPANSION"
        FontBold        =   -1  'True
        FontItalic      =   -1  'True
        FontName        =   "MS Sans Serif"
        FontSize        =   8.25
        FontStrikethru  =   0   'False
        FontUnderline   =   0   'False
        Height          =   255
        Left            =   240
        TabIndex        =   5
        Top             =   1560
        Width           =   1215
    End
    Begin Label Label4
        BackColor       =   &H00FFFFFF&
        Caption         =   "CD-ROM SOFTWARE"
        Height          =   255
        Left            =   360
        TabIndex        =   4
        Top             =   2280
        Width           =   2055
    End
    Begin Label Label3
        BackColor       =   &H0080FFFF&
        Caption         =   "EXPERT CS"
        Height          =   200
        Left            =   2640
        TabIndex        =   2
        Top             =   1800
        Width           =   1095
    End
    Begin Label Label2
        BorderStyle     =   1   'Fixed Single
        Caption         =   "STANDARD ENCYLOPEDIA ARTICLE"
        Height          =   255
        Left            =   120
        TabIndex        =   1
        Top             =   120
        Width           =   3255
    End
```

-37-

```
BRADE.FRM - 8
    Begin Label Label1
        Caption    =    "CD-ROM, in computer science, acronym for compact dis
        Height     =    975
        Left       =    360
        TabIndex   =    0
        Top        =    480
        Width.     =    8775
    End
End
```

What is claimed is:

1. An enhanced electronic encyclopedia comprising:
   a plurality of encyclopedic base articles stored in a memory together forming an encyclopedia;
   supplemental articles corresponding to selected base articles stored in a memory, wherein selected supplemental articles include a reference to an independent work;
   a path for paid access to said independent work;
   a processor connected to said memory storing said base articles and said memory storing said supplemental articles;
   an input device connected to said processor for receiving a base article selection, a supplemental article selection, and a request for said paid access to an independent work from a user; and
   an output device connected to said processor for communicating to a user a base article, a supplemental article and access to an independent work corresponding to said base article selection, said supplemental article selection, and said request for said paid access to said independent work, respectively.

2. The enhanced electronic encyclopedia defined in claim 1, wherein said supplemental article is selected from a group consisting of a review, a summary, or an explanation of said independent work.

3. The enhanced electronic encyclopedia defined in claim 1, wherein said independent work is selected from a group consisting of a journal, a magazine, a lecture, a book, a newspaper, or a news report, or an excerpt thereof.

4. The enhanced electronic encyclopedia defined in claim 1, wherein said independent work is stored in a memory of said enhanced electronic encyclopedia.

5. The enhanced electronic encyclopedia defined in claim 4, wherein said independent work is encrypted and said path for said paid access comprises an access code for opening said path.

6. The enhanced electronic encyclopedia defined in claim 1, wherein said independent work is stored separately from said enhanced electronic encyclopedia.

7. The enhanced electronic encyclopedia defined in claim 6, wherein said independent work is provided by an on-line service and said path for said paid access provides access to said independent work via said on-line service.

8. The enhanced electronic encyclopedia defined in claim 1, wherein each of said base articles has an assigned objective rating, wherein said objective rating is an objective measure of relative importance or relative popularity of the base article to which said objective rating is assigned, and wherein said selected base articles have an assigned objective rating that is greater than a predetermined minimum objective rating.

9. The enhanced electronic encyclopedia defined in claim 8, wherein said objective rating assigned to each of said base articles is an importance rating corresponding to the frequency with which an article identifier assigned to each of said base articles occurs in a selected sample of text.

10. The enhanced electronic encyclopedia defined in claim 8, wherein said objective rating assigned to each of said base articles is a popularity rating corresponding to the frequency with which an article identifier assigned to each of said base articles occurs in a literary sample.

11. The enhanced electronic encyclopedia defined in claim 1, wherein said supplemental articles comprise an assigned label identifying supplemental article characteristics.

12. The enhanced electronic encyclopedia defined in claim 11, wherein said supplemental article characteristics identified by said label include a supplemental article difficulty level and a supplemental article type.

13. The enhanced electronic encyclopedia defined in claim 11, wherein said supplemental article characteristics identified by said label include a supplemental article author identification.

14. An enhanced electronic encyclopedia having articles selected for expansion with supplemental articles and providing electronic access to other works, said enhanced electronic encyclopedia comprising:
   a plurality of encyclopedic base articles stored in a memory together forming an encyclopedia, each of said base articles comprising an article text;
   supplemental articles corresponding to selected base articles stored in a memory, wherein selected supplemental articles comprise a reference to an independent work;
   means for electronic access to said independent work in exchange for a payment;
   manipulating means connected to said memory storing said base articles and said memory storing said supplemental articles for manipulating said base articles and said supplemental articles;
   receiving means connected to said manipulating means for receiving from a user a base article selection, a supplemental article selection, and a request for said electronic access to said independent work; and
   communicating means connected to said manipulating means for communicating to a user said article text of a base article, a supplemental article, and electronic access to an independent work corresponding to said base article selection, said supplemental article selection, and said request for said electronic access, respectively.

15. The enhanced electronic encyclopedia defined in claim 14, wherein said supplemental article is selected from a group consisting of a review, a summary, or an explanation of said independent work.

16. The enhanced electronic encyclopedia defined in claim 14, wherein said independent work is selected from a group consisting of a journal, a magazine, a lecture, a book, a newspaper, or a news report, or an excerpt thereof.

17. The enhanced electronic encyclopedia defined in claim 14, wherein said independent work is stored in a memory of said enhanced electronic encyclopedia.

18. The enhanced electronic encyclopedia defined in claim 17, wherein said independent work is encrypted and said means for said electronic access comprises a code providing access to said memory.

19. The enhanced electronic encyclopedia defined in claim 14, wherein said independent work is stored separately from said enhanced electronic encyclopedia.

20. The enhanced electronic encyclopedia defined in claim 19, wherein access to said independent work is provided by an on-line service and said means for said electronic access comprises a connection for access to said on-line service.

21. The enhanced electronic encyclopedia defined in claim 14, wherein each of said base articles has an assigned objective rating, wherein said objective rating is an objective measure of relative importance or relative popularity of the base article to which said objective rating is assigned, and wherein said selected base articles have an assigned objective rating that is greater than a predetermined minimum objective rating.

22. The enhanced electronic encyclopedia defined in claim 21, wherein said objective rating assigned to each of said base articles is an importance rating corresponding to the frequency with which an article identifier assigned to each of said base articles occurs in a selected sample of text.

23. The enhanced electronic encyclopedia defined in claim 21, wherein said objective rating assigned to each of said base articles is a popularity rating corresponding to the frequency with which an article identifier assigned to each of said base articles occurs in a literary sample.

24. The enhanced electronic encyclopedia defined in claim 14, wherein each of said supplemental articles has an assigned label identifying supplemental article characteristics.

25. The enhanced electronic encyclopedia defined in claim 24, wherein said supplemental article characteristics identified by said label include a supplemental article difficulty level and a supplemental article type.

26. The enhanced electronic encyclopedia defined in claim 24, wherein said supplemental article characteristics identified by said label include a supplemental article author identification.

27. A method for creating an enhanced electronic encyclopedia having articles selected for expansion, said enhanced electronic encyclopedia having a database with base articles and supplemental articles corresponding to selected base articles, said method comprising the steps of:

(A) forming said database by
  (i) providing a plurality of encyclopedic base articles together forming an encyclopedia, each of said base articles having an article text,
  (ii) providing supplemental articles for selected base articles, and
  (iii) providing a reference in selected supplemental articles to an independent work;
(B) providing paid access to said independent work;
(C) storing said database in a memory;
(D) connecting to said memory a processor for manipulating said database;
(E) connecting to said processor an input device for receiving from a user a base article selection, a supplemental article selection, and a request for said paid access to said independent work; and
(F) connecting to said processor an output device for communicating to a user said article text of a base article, a supplemental article, and access to an independent work corresponding to said base article selection, said supplemental selection, and said request for said paid access, respectively.

28. The method defined in claim 27, wherein said independent work is encrypted and said step of providing paid access to said independent work comprises providing a code for access to said independent work.

29. The method defined in claim 27, wherein access to said independent work is provided by an on-line service and said step of providing paid access comprises providing access to said on-line service.

30. An enhanced electronic encyclopedia wherein relatively important or relatively popular articles are selected objectively for expansion with supplemental articles, said enhanced electronic encyclopedia comprising:

a database stored in at least one memory, said database comprising a plurality of encyclopedic base articles, each of said base articles having an assigned objective rating, wherein said objective rating is an objective measure of relative importance or relative popularity of the base article to which said objective rating is assigned as compared to other said base articles, said database further comprising at least one supplemental article corresponding to selected base articles wherein said selected base articles have an assigned objective rating that is greater than a predetermined minimum objective rating;

a processor connected to said memory for manipulating said database;

an input device connected to said processor for receiving a base article selection and a supplemental article selection from a user; and an output device connected to said processor for communicating to a user a base article and a supplemental article corresponding to said base article selection and to said supplemental article selection, respectively.

* * * * *